United States Patent
Fletcher et al.

(10) Patent No.: US 8,443,220 B2
(45) Date of Patent: May 14, 2013

(54) AUTOMATED VOLTAGE CONTROL FOR SCHEDULED SERVER OUTAGE IN SERVER CLUSTER BY DETERMINING FUTURE WORKLOAD INCREASE FOR REMAINING SERVERS BASED UPON SERVICE LEVEL OBJECTIVES AND DETERMINING ASSOCIATED VOLTAGE ADJUSTMENTS

(75) Inventors: James C. Fletcher, Apex, NC (US); David L. Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 12/561,524

(22) Filed: Sep. 17, 2009

(65) Prior Publication Data

US 2011/0067033 A1 Mar. 17, 2011

(51) Int. Cl.
*G06F 1/26* (2006.01)
*G06F 1/00* (2006.01)
*G06F 9/46* (2006.01)

(52) U.S. Cl.
USPC ............... 713/320; 713/324; 718/105

(58) Field of Classification Search ............... 718/105; 713/320, 324
See application file for complete search history.

(56) References Cited

U.S. PATENT DOCUMENTS

| | | | |
|---|---|---|---|
| 6,389,448 B1 * | 5/2002 | Primak et al. | 718/105 |
| 2002/0040402 A1 * | 4/2002 | Levy-Abegnoli et al. | 709/229 |
| 2003/0079151 A1 * | 4/2003 | Bohrer et al. | 713/320 |
| 2008/0059972 A1 * | 3/2008 | Ding et al. | 718/105 |
| 2008/0183876 A1 * | 7/2008 | Duvur et al. | 709/228 |
| 2008/0209243 A1 * | 8/2008 | Ghiasi et al. | 713/320 |
| 2009/0037367 A1 * | 2/2009 | Wein | 707/2 |
| 2009/0254552 A1 * | 10/2009 | Vinberg et al. | 707/6 |
| 2010/0211810 A1 * | 8/2010 | Zacho | 713/324 |

* cited by examiner

*Primary Examiner* — Thomas Lee
*Assistant Examiner* — Terrell Johnson
(74) *Attorney, Agent, or Firm* — Lee Law, PLLC; Christopher B. Lee (57) ABSTRACT

Information regarding a scheduled outage for a server associated with a cluster of servers is received at a voltage regulation system (VRS) for the cluster of servers. A work load increase is determined for each remaining server within the cluster of servers due to the scheduled outage for the server. A voltage adjustment is calculated for each remaining server based upon the determined work load increase for each remaining server. Voltage for each remaining server is automatically adjusted based upon the calculated voltage adjustment.

17 Claims, 4 Drawing Sheets

AUTOMATED VOLTAGE CONTROL FOR SCHEDULED SERVER OUTAGE IN SERVER CLUSTER BY DETERMINING FUTURE WORKLOAD INCREASE FOR REMAINING SERVERS BASED UPON SERVICE LEVEL OBJECTIVES AND DETERMINING ASSOCIATED VOLTAGE ADJUSTMENTS

BACKGROUND

The present invention relates to voltage control for remaining servers associated with server clusters. More particularly, the present invention relates to automated voltage control for server outages.

Data centers house servers for use in computational processing of information. The number of servers at a data center may be based upon the volume of information processing performed by a given data center. Servers may be arranged in clusters. Load sharing may be implemented to allow load to be shared by servers arranged in a cluster or throughout the data center.

BRIEF SUMMARY

A method includes: receiving, at a voltage regulation system (VRS) for a cluster of servers, information regarding a scheduled outage for a server associated with the cluster of servers; determining a work load increase for each remaining server within the cluster of servers due to the scheduled outage for the server; calculating a voltage adjustment for each remaining server based upon the determined work load increase for each remaining server; and automatically adjusting voltage for each remaining server based upon the calculated voltage adjustment.

A system includes a communication module; and a voltage regulation module configured to: receive, via the communication module, information regarding a scheduled outage for a server associated with a cluster of servers; determine a work load increase for each remaining server within the cluster of servers due to the scheduled outage for the server; calculate a voltage adjustment for each remaining server based upon the determined work load increase for each remaining server; and automatically adjust voltage for each remaining server based upon the calculated voltage adjustment.

A computer program product includes: a computer readable storage medium having computer readable program code embodied therewith, the computer readable program code including: computer readable program code configured to receive, at a voltage regulation system (VRS) for a cluster of servers, information regarding a scheduled outage for a server associated with the cluster of servers; computer readable program code configured to determine a work load increase for each remaining server within the cluster of servers due to the scheduled outage for the server; computer readable program code configured to calculate a voltage adjustment for each remaining server based upon the determined work load increase for each remaining server; and computer readable program code configured to automatically adjust voltage for each remaining server based upon the calculated voltage adjustment.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated voltage control for server outages. For servers associated with data centers that have an ability to operate at a range of voltages, higher voltage use generally corresponds to increased overall application performance and energy consumption. To limit energy consumption, server voltages may be reduced to a point above performance degradation to limit impact on service level objectives (SLOs). Server outages, such as via administrative maintenance of a server, an outage or maintenance of a router or storage device associated with the server, or other unscheduled server outages impact performance of the remaining servers and may impact the SLOs for the data center. The automated voltage control for server outages described herein compensates for server outages and increases voltage levels to remaining servers automatically. As such, SLOs for the data center may be maintained.

As such, the present subject matter includes a voltage regulation system (VRS) for a cluster of servers. The VRS receives information regarding a scheduled outage for a server associated with the cluster of servers. The information may be received, for example, from a configuration management database (CMDB), a service desk, or other information source. A work load increase for each remaining server within the cluster of servers due to the scheduled outage for the server is determined. A voltage adjustment for each remaining server is calculated based upon the determined work load increase for each remaining server and the voltage for each remaining server is automatically adjusted based upon the calculated voltage adjustment. Though the examples described below are based upon scheduled server outages, it is understood that the present subject matter may be utilized in association with unplanned and unscheduled server outages without departure from the scope of the present subject matter.

The automated voltage control for server outages described herein may be performed in real time to allow prompt control of voltage for remaining servers in association with server outages. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
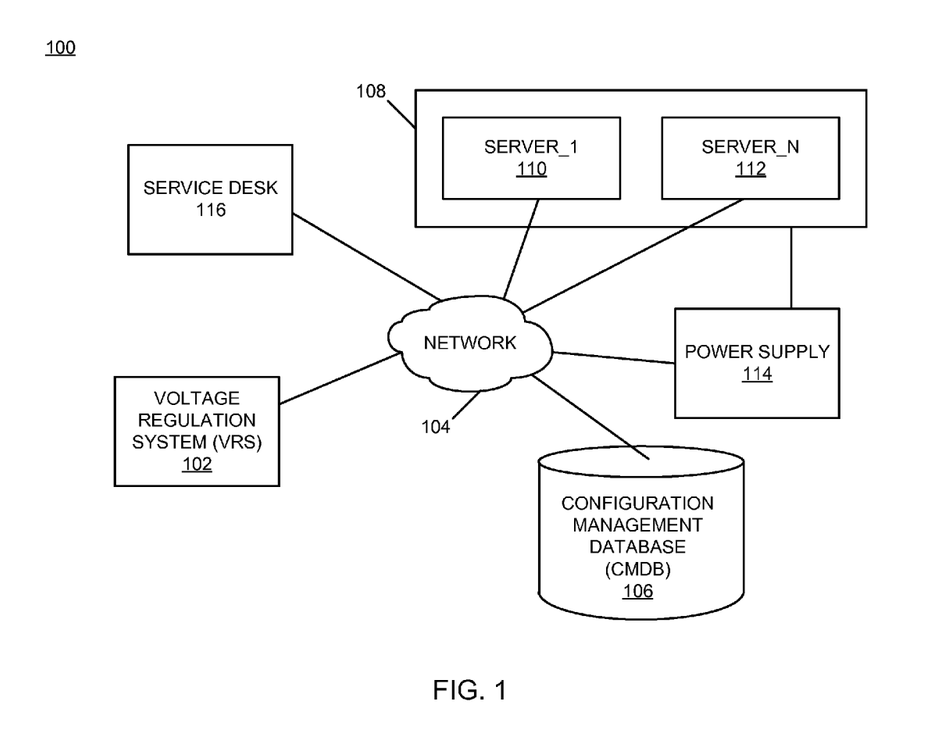
FIG. 1 is a block diagram of an example of an implementation of a system for automated voltage control for server outages according to an embodiment of the present subject matter.

FIG. 1 is a block diagram of an example of an implementation of a system 100 for automated voltage control for server outages. A voltage regulation system VRS 102 is shown interconnected via a network 104 to a configuration management database (CMDB) 106 and a server cluster 108. The server cluster 108 includes a server_1 110 through a server_N 112. For ease of reference herein, references to individual servers, such as any of the server_1 110 through the server_N 112, shall be made by reference to "a server" or "the server" within the server cluster 108.

A power supply module 114 is illustrated and represents a voltage regulation or power supply module for servers within the server cluster 108. As such, the power supply module 114 is controlled by the VRS 102 to adjust voltages for the various servers within the server cluster 108. It is understood that the power supply module 114 may be a single module that supplies power to all of the servers within the server cluster 108, or that the power supply module 114 may include a set of power supply modules associated with each respective server within the server cluster 108 without departure from the scope of the present subject matter. It is also understood that the power supply module 114 includes variable voltage output and power capabilities and is controllable by the VRS 102 to adjust output voltages for the respective servers of the server cluster 108.

A service desk 116 is shown interconnected via the network 104. The service desk may generate scheduled outage reports or unplanned outage reports that may be received and processed by the VRS 102, as described in more detail below, to provide the automated voltage control for server outages. Alternatively, the CMDB 106 may provide scheduled outage information useable by the VRS 102 for the processing described herein. As such, either scheduled or unplanned outages may be managed in an automated manner by the VRS 102 based upon server outage information received from a variety of sources.

As will be described in more detail below in association with FIGS. 2 through 4, the VRS 102 provides automated voltage control for server outages. The automated voltage control for server outages is based upon either projected (e.g., scheduled) server outages or unanticipated server outages. The automated voltage control for server outages includes control of voltage for servers within a server cluster, such as the server cluster 108. It is further understood that the server cluster 108 may represent an entire data center of servers, whether individually arranged or whether arranged as clusters for purposes, such as load sharing, for fulfillment of SLOs.

It should be noted that the VRS 102 may be any computing device capable of processing information as described above and in more detail below. For example, the VRS 102 may include devices such as a personal computer (e.g., desktop, laptop, palm, etc.) or a handheld device (e.g., cellular telephone, personal digital assistant (PDA), or email device, etc.), or any other device capable of processing information as described in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
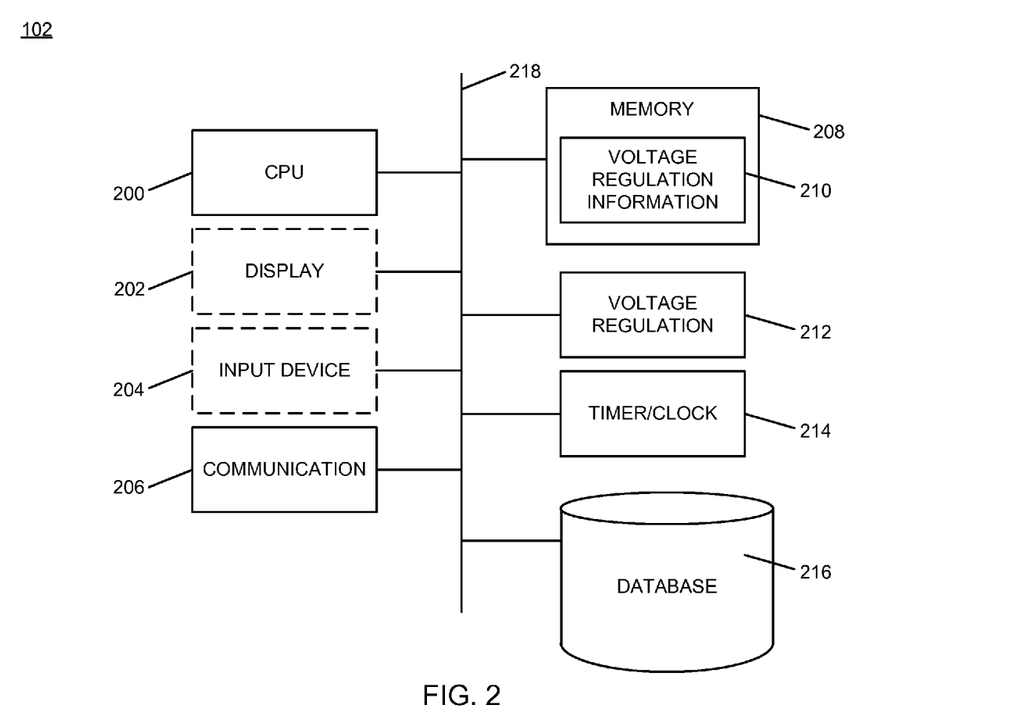
FIG. 2 is a block diagram of an example of an implementation of a voltage regulation system (VRS) that is capable of performing automated voltage control for server outages according to an embodiment of the present subject matter.

FIG. 2 is a block diagram of an example of an implementation of the VRS 102 that is capable of performing automated voltage control for server outages. A central processing unit (CPU) 200 provides computer instruction execution, computation, and other capabilities within the VRS 102. A display 202 provides visual information to a user of the VRS 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they may be optional components for the VRS 102 for certain implementations. Accordingly, the VRS 102 may operate as a completely automated embedded device without user configurability or feedback. However, the VRS 102 may also provide user feedback and configurability via the display 202 and the input device 204, respectively.

A communication module 206 provides interconnection capabilities that allow the VRS 102 to communicate with other modules within the system 100, such as the server cluster 108 and the server_1 110 through the server_N 112, to control voltage for the respective servers in association with server outages. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A memory 208 includes a voltage regulation information storage area 210 that stores information for use in association with voltage regulation of the servers within the server cluster 108 by the VRS 102. As will be described in more detail below, the information stored within the voltage regulation information storage area 210 is used to calculate appropriate controls for voltage adjustments for the respective servers of the server cluster 108. The information stored within the voltage regulation information storage area 210 is also used to store maximum voltages, minimum voltages, work load (e.g., throughput) changes based upon voltage changes for the respective servers of the server cluster 108, and other related information.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

A voltage regulation module 212 is also illustrated. The voltage regulation module 212 provides calculation and control capabilities for the VRS 102, as described above and in more detail below. As such, the voltage regulation module 212 provides output controls (not illustrated) for adjustment of voltages for the servers within the server cluster 108, such as via the power supply module 114. Alternatively, the voltage regulation module 212 may communicate with the power supply module 114 via the communication module 206 without departure from the scope of the present subject matter. The voltage regulation module 212 implements the automated voltage regulation of the VRS 102. It is also understood that the voltage regulation module 212 obtains information about configuration aspects, such as scheduled or planned outages, from the CMDB 106 and may store this information either internally within memory associated with the voltage regulation module 212 or within the voltage regulation information storage area 210 within the memory 208.

A timer/clock module 214 is illustrated and used to determine timing for synchronization of activities associated with scheduled outages, such as a start time and an expiration time, as discussed in more detail below. As such, the voltage regulation module 212 may utilize information derived from the timer/clock module 214 for synchronization of activities associated with scheduled outages, as described in more detail below.

Though the voltage regulation module 212 and the timer/clock module 214 are illustrated as component-level modules for ease of illustration and description purposes, it should be noted that the voltage regulation module 212 and the timer/clock module 214 may include any hardware, programmed processor(s), and memory used to carry out the respective functions of these modules as described above and in more detail below. For example, the voltage regulation module 212 and the timer/clock module 214 may include additional controller circuitry in the form of application specific integrated circuits (ASICs), processors, and/or discrete integrated circuits and components for performing communication and electrical control activities associated with the respective devices. Additionally, the voltage regulation module 212 and the timer/clock module 214 may include interrupt-level, stack-level, and application-level modules as appropriate. Furthermore, the voltage regulation module 212 and the timer/clock module 214 may include any memory components used for storage, execution, and data processing for performing processing activities associated with the module.

It should also be noted that the voltage regulation module 212 and the timer/clock module 214 may form a portion of other circuitry described without departure from the scope of the present subject matter. Further, the voltage regulation module 212 and the timer/clock module 214 may alternatively be implemented as an application stored within the memory 208. In such an implementation, the voltage regulation module 212 and the timer/clock module 214 may include instructions executed by the CPU 200 for performing the functionality described herein. The CPU 200 may execute these instructions to provide the processing capabilities described above and in more detail below for the VRS 102. The voltage regulation module 212 and the timer/clock module 214 may form a portion of an interrupt service routine (ISR), a portion of an operating system, a portion of a browser application, or a portion of a separate application without departure from the scope of the present subject matter.

A database 216 is associated with the VRS 102 and provides storage capabilities for information in the form of tables or other arrangements accessible by the VRS 102 associated with the automated voltage control for server outages described herein. The database 216 may store information, such as configuration and topology of the server cluster 108, server capabilities of different servers within the server cluster 108, and other information associated with the servers within the server cluster 108.

The CPU 200, the display 202, the input device 204, the communication module 206, the memory 208, the voltage regulation module 212, the timer/clock module 214, and the database 216 are interconnected via an interconnection 218. The interconnection 218 may include a system bus, a network, or any other interconnection capable of providing the respective components with suitable interconnection for the respective purpose.

While the VRS 102 is illustrated with and has certain components described, other modules and components may be associated with the VRS 102 without departure from the scope of the present subject matter. Additionally, it should be noted that, while the VRS 102 is described as a single device for ease of illustration purposes, the components within the VRS 102 may be co-located or distributed and interconnected via a network without departure from the scope of the present subject matter. For a distributed arrangement, the display 202 and the input device 204 may be located at a kiosk or other location, while the CPU 200 and memory 208 may be located at a local or remote server in communication with the server cluster 108. Many other possible arrangements for components of the VRS 102 are possible and all are considered within the scope of the present subject matter. It should also be understood that, though the voltage regulation information storage area 210 is shown within the memory 208, it may also be stored within the database 216 without departure from the scope of the present subject matter. Accordingly, the VRS 102 may take many forms and may be associated with many platforms.

Figure 3:
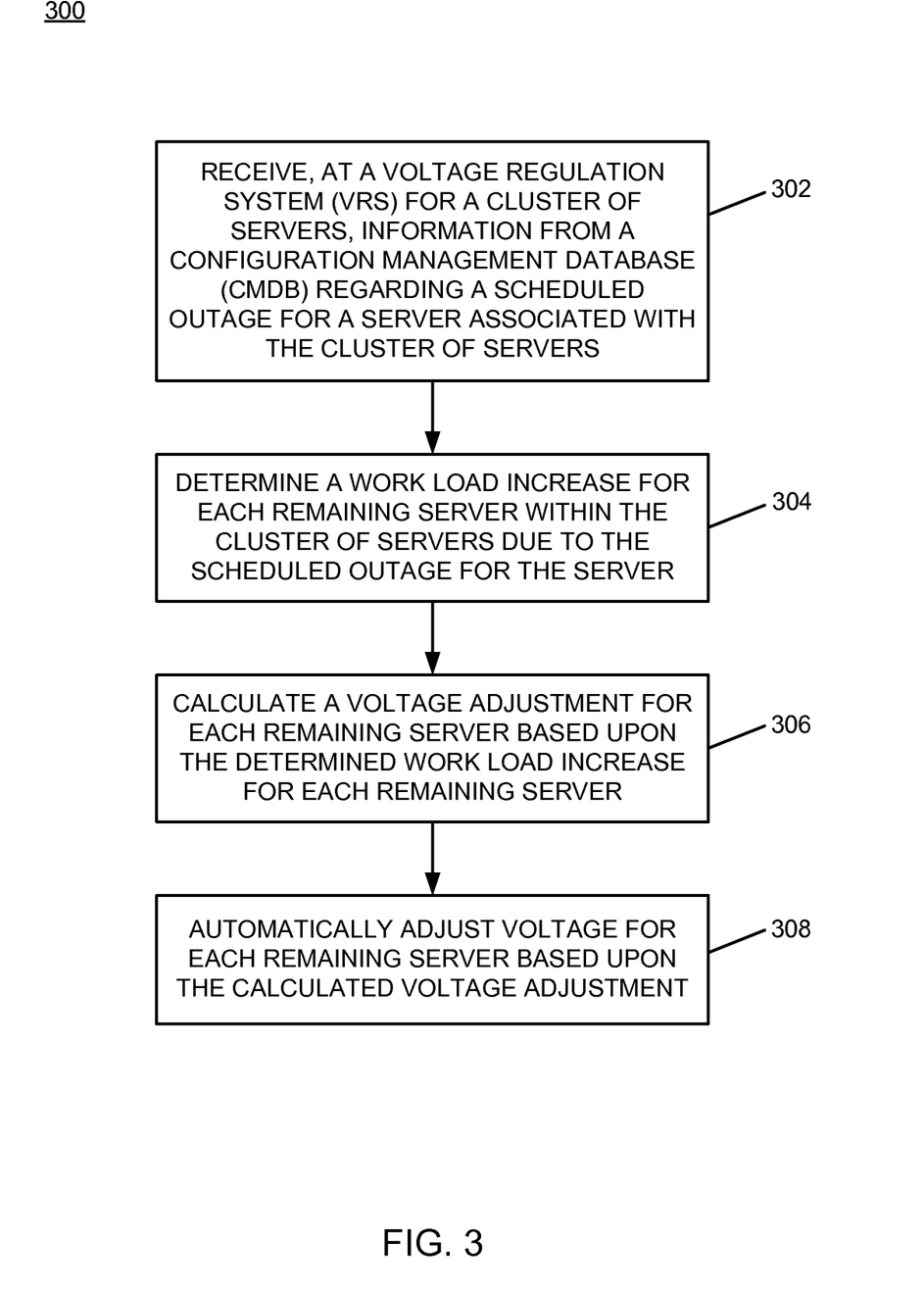
FIG. 3 is a flow chart of an example of an implementation of a process for automated voltage control for server outages according to an embodiment of the present subject matter.
Figure 4:
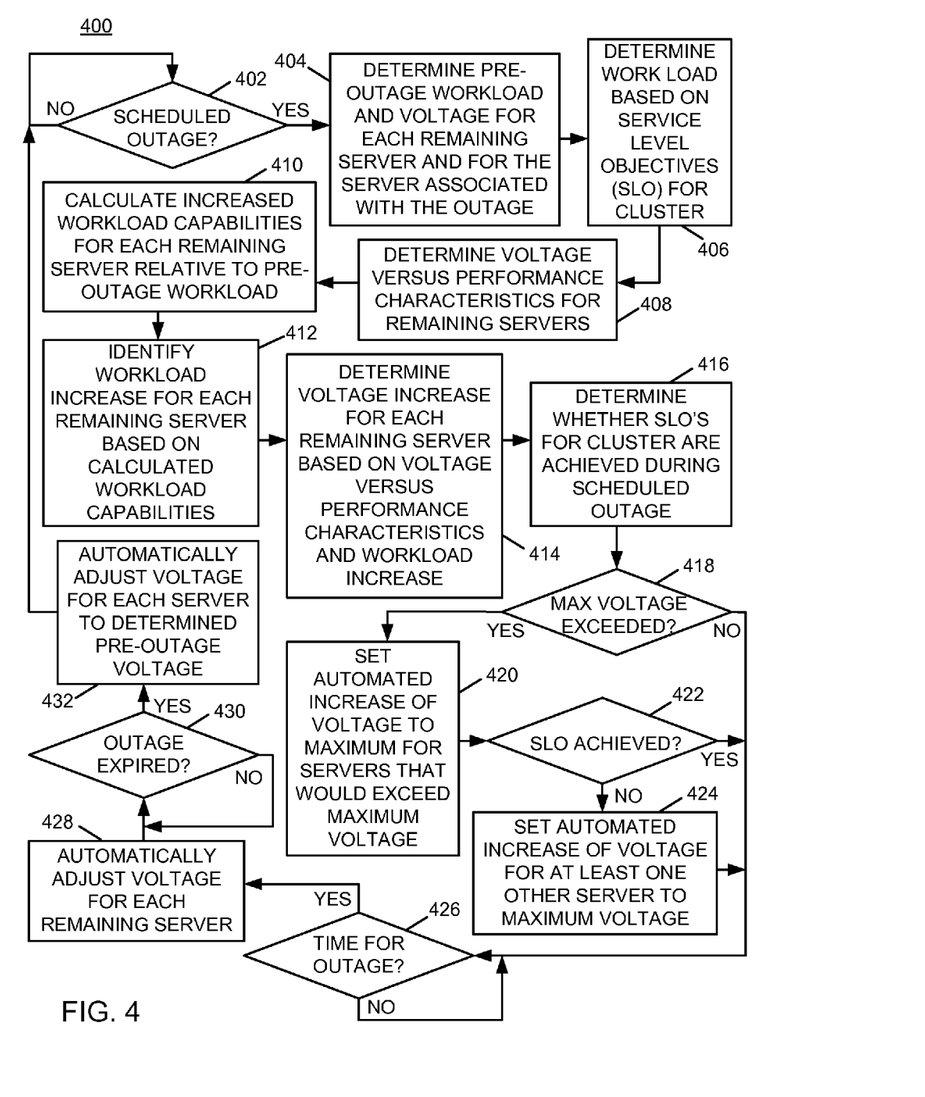
FIG. 4 is a flow chart of an example of an implementation of a process for automated voltage control and service level objective (SLO) compensation for server outages according to an embodiment of the present subject matter.

FIG. 3 through FIG. 4 below describe example processes that may be executed by devices, such as the VRS 102, to perform the automated voltage control for server outages associated with the present subject matter. Many other variations on the example processes are possible and all are considered within the scope of the present subject matter. The example processes may be performed by modules, such as the voltage regulation module 212 and/or executed by the CPU 200, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated voltage control for server outages. At block 302, the process 300 receives, at a voltage regulation system (VRS) for a cluster of servers, information from a configuration management database (CMDB) regarding a scheduled outage for a server associated with the cluster of servers. At block 304, the process 300 determines a work load increase for each remaining server within the cluster of servers due to the scheduled outage for the server. At block 306, the process 300 calculates a voltage adjustment for each remaining server based upon the determined work load increase for each remaining server. At block 308, the process 300 automatically adjusts voltage for each remaining server based upon the calculated voltage adjustment.

FIG. 4 is a flow chart of an example of an implementation of a process 400 for automated voltage control and SLO compensation for server outages. At decision point 402, the process 400 makes a determination as to whether a scheduled outage has been configured for the servers within the server cluster 108. A scheduled outage may be configured, as discussed above, by the CMDB 106 and communicated to the VRS 102. Further, the information received from the CMDB 106 regarding the scheduled outage for one or more servers associated with the server cluster 108 may include a scheduled time and a scheduled duration associated with the scheduled outage. However, it should be noted that the process 400 may be executed during an unplanned outage without departure from the scope of the present subject matter. In such a situation, the processing associated with decision point 402 may be invoked in response to detection of a server outage. As such, the process 400 represents an example of processing initiated in response to receipt of information associated with a scheduled outage for ease of illustration purposes. Additionally, the process 400 assumes that a single server is scheduled for the outage, though multiple server outages may be processed similarly to the description below for a single server.

When a determination is made that a scheduled outage has been configured and scheduled by the CMDB 106, the process 400 determines a pre-outage work load and voltage for each remaining server and for the server associated with the outage within the server cluster 108 at block 404. At block 406, the process 400 determines SLOs for the server cluster 108 and determines a work load increase for each remaining server based upon the determined SLOs for the server cluster 108. Determining the work load increase for each remaining server within the server cluster 108 due to the scheduled outage for the server may include determining the work load increase for each remaining server using a model for each remaining server that relates computational throughput to voltage for each remaining server. The model that relates computational throughput to voltage for each remaining server may be stored, for example, within the voltage regulation information storage area 210 within the memory 208.

At block 408, the process 400 determines the voltage versus performance characteristics for the remaining servers. Again, this determination may be made via use of a model that relates computational throughput to voltage for each remaining server. At block 410, the process 400 calculates increased work load capabilities for each remaining server relative to the determined pre-outage work load for each remaining server within the server cluster 108. This calculation may be based upon the model that relates computational throughput to voltage for each remaining server.

At block 412, the process 400 identifies the work load increase for each remaining server based upon the calculated increased work load capabilities for each remaining server. The identified work load increase may be identified for each remaining server based upon different increased work load capabilities for each respective remaining server, and may also be based upon server model, processing capabilities, age of each respective server, or other characteristics. As such, the identified work load increase for each remaining server may be different to achieve the SLOs for the server cluster 108 during the server outage and based upon differences in the respective remaining servers.

At block 414, the process 400 determines a voltage adjustment (e.g, increase in the present example) for each remaining server based upon the determined voltage versus performance characteristics of each remaining server and the workload increase identified for each remaining server. At block 416, the process 400 determines whether the SLOs for the server cluster 108 are achieved by the server cluster 108 during the server outage.

At decision point 418, the process 400 makes a determination as to whether the required voltage increase for any remaining server exceeds a maximum voltage for any remaining server in order to satisfy the SLOs for the server cluster 108. As such, the process 400 determines whether the required voltage increase for each remaining server exceeds a maximum voltage for each respective remaining server. When a determination is made that the maximum voltage for any remaining server would be exceeded in order to satisfy the SLOs, at block 420 the process 400 sets the automated adjustment (e.g., increase in the present example) of voltage to the maximum voltage for each respective remaining server determined to require the voltage increase that exceeds the maximum voltage for the respective server.

At decision point, 422, the process 400 makes a determination as to whether the SLO for the server cluster 108 will be achieved when the automated adjustment (e.g., increase) of voltage is set to the maximum voltage for each respective remaining server determined to require a voltage increase that exceeds the maximum voltage for the respective server. When a determination is made that the SLO will not be achieved when the automated adjustment (e.g., increase) of voltage is set to the maximum voltage for each respective remaining server determined to require a voltage increase that exceeds the maximum voltage for the respective server, the process 400 sets the automated increase of voltage for at least one other remaining server to a maximum voltage for the respective remaining server to achieve the target SLO for the server cluster 108 at block 424.

When a determination is made at decision point 418 that the maximum voltage would not be exceeded by the determined voltage for any of the remaining servers, or upon determining at decision point 422 that the SLO will be achieved by setting the increase of voltage to the maximum for any remaining servers determined to require a voltage increase that exceeds the maximum voltage for the respective server, or upon completion of setting the automated increase of voltage for at least one other remaining server to a maximum voltage for the respective remaining server to achieve the target SLO for the server cluster 108 at block 424, the process 400 waits for the time for the outage at decision point 426 to synchronize voltage adjustment for the remaining servers with the scheduled outage. The process 400 may utilize information derived from the timer/clock module 214, described above, to determine timing for these synchronization activities.

As such, the process 400 synchronizes the automated adjustment of the voltage for each remaining server with the scheduled time associated with the scheduled outage for the server. However, it should be noted that, as described above, if the outage is not a scheduled outage, the process 400 would not wait at decision point 426 to synchronize the automated adjustment of the voltage for each remaining server with the scheduled time associated with the scheduled outage for the server.

When a determination is made at decision point 426 that the time has arrived for synchronization of the automated adjustment of the voltage for each remaining server with the scheduled time associated with the scheduled outage for the server, the process 400 automatically adjusts the voltage for each remaining server to the determined voltage for each remaining server during the outage at block 428.

At decision point 430, the process 400 makes a determination as to whether the scheduled outage for the server has expired based upon the scheduled time and the scheduled duration associated with the scheduled outage for the server. When a determination is made that the scheduled outage has expired, the process 400 automatically adjusts the voltage for each remaining server to the determined pre-outage voltage associated with each remaining server at block 432. It is noted that the process 400 may also be configured to adjust the voltage for the server associated with the outage to its pre-outage voltage. However, this action should be associated with additional processing suitable for the given implementation to coordinate a completion of any work performed on the respective server associated with the outage. As such, the determination at decision point 430 may also be based upon inputs, such as via the input device 204 from administrative personnel indicating that it is safe to adjust the voltage of the server actually involved in the outage to its pre-outage voltage level. Upon completion of automatically adjusting the voltage for each remaining server to the determined pre-outage voltage associated with each remaining server at block 432, the process 400 returns to decision point 402 to await a new outage or information associated with a scheduled outage.

As such, the process 400 provides for determination of pre-outage work load and voltages for servers in a cluster, such as the server cluster 108, and determines suitable adjustments to voltage to increase performance and throughput (e.g., work) of the remaining servers during the outage. The process 400 performs service level objective (SLO) compensation in association with automated voltage control for the remaining servers to maintain SLOs during server outages. The process 400 also synchronizes automated adjustment of server voltages with scheduled outages and automatically sets the voltages of the remaining servers to their respective pre-outage voltages upon completion or expiration of the outage.

As described above in association with FIG. 1 through FIG. 4, the example systems and processes provide automated voltage control for server outages. Many other variations and additional activities associated with automated voltage control for server outages are possible and all are considered within the scope of the present subject matter.

Those skilled in the art will recognize, upon consideration of the above teachings, that certain of the above examples are based upon use of a programmed processor, such as the CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    receiving, at a voltage regulation system (VRS) for a cluster of servers, information regarding a scheduled outage for a server associated with the cluster of servers;
    determining service level objectives (SLOs) for the cluster of servers;
    determining a future work load increase for each remaining server within the cluster of servers due to the scheduled outage for the server, comprising:
        determining the future work load increase for each remaining server based upon the determined SLOs for the cluster of servers; and
        determining whether the SLOs for the cluster of servers are achieved by the cluster of servers during the scheduled outage;
    calculating a voltage adjustment for each remaining server based upon the determined future work load increase for each remaining server; and
    automatically adjusting voltage of each remaining server at the scheduled outage for the server using the respective calculated voltage adjustment for each remaining server.

2. The method of claim 1, where the information regarding the scheduled outage for the server associated with the cluster of servers is received from a configuration management database and comprises a scheduled time and a scheduled duration associated with the scheduled outage for the server; and
    where automatically adjusting the voltage of each remaining server at the scheduled outage for the server using the respective calculated voltage for each remaining server comprises synchronizing the automated voltage adjustment of each remaining server with the scheduled time associated with the scheduled outage for the server.

3. The method of claim 2, further comprising:
    determining a pre-outage voltage associated with each remaining server;
    determining that the scheduled outage for the server has expired based upon the scheduled time and the scheduled duration associated with the scheduled outage for the server; and
    automatically adjusting the voltage for each remaining server to the determined pre-outage voltage associated with each remaining server.

4. The method of claim 1, where determining the future work load increase for each remaining server within the cluster of servers due to the scheduled outage for the server comprises:

determining a pre-outage work load for each remaining server within the cluster of servers;
determining a pre-outage work load for the server associated with the scheduled outage;
calculating increased work load capabilities for each remaining server relative to the determined pre-outage work load for each remaining server within the cluster of servers; and
identifying the future work load increase for each remaining server based upon the calculated increased work load capabilities for each remaining server.

5. The method of claim 1, where calculating the voltage adjustment for each remaining server based upon the determined future work load increase for each remaining server comprises:
determining voltage versus performance characteristics for each remaining server; and
determining a voltage adjustment for each remaining server based upon the determined voltage versus performance characteristics for each remaining server.

6. The method of claim 1, where calculating the voltage adjustment for each remaining server based upon the determined future work load increase for each remaining server comprises:
determining a required voltage increase for each remaining server based upon the determined future work load increase for each remaining server;
determining whether the required voltage increase for each remaining server exceeds a maximum voltage for each respective remaining server; and
setting, for each respective remaining server determined to require the voltage increase that exceeds the maximum voltage for the respective server, the automated voltage adjustment to the maximum voltage for each respective remaining server.

7. A system, comprising:
a communication module; and
a voltage regulation module configured to:
receive, via the communication module, information regarding a scheduled outage for a server associated with a cluster of servers;
determine service level objectives (SLOs) for the cluster of servers;
determine a future work load increase for each remaining server within the cluster of servers due to the scheduled outage for the server, the voltage regulation module being configured to:
determine the future work load increase for each remaining server based upon the determined SLOs for the cluster of servers; and
determine whether the SLOs for the cluster of servers are achieved by the cluster of servers during the scheduled outage;
calculate a voltage adjustment for each remaining server based upon the determined future work load increase for each remaining server; and
automatically adjust voltage of each remaining server at the scheduled outage for the server using the respective calculated voltage adjustment for each remaining server.

8. The system of claim 7, where the information regarding the scheduled outage for the server associated with the cluster of servers is received from a configuration management database and comprises a scheduled time and a scheduled duration associated with the scheduled outage for the server; and where, in being configured to automatically adjust the voltage of each remaining server at the scheduled outage for the server using the respective calculated voltage for each remaining server, the voltage regulation module is configured to synchronize the automated voltage adjustment of each remaining server with the scheduled time associated with the scheduled outage for the server.

9. The system of claim 8, where the voltage regulation module is further configured to:
determine a pre-outage voltage associated with each remaining server;
determine that the scheduled outage for the server has expired based upon the scheduled time and the scheduled duration associated with the scheduled outage for the server; and
automatically adjust the voltage for each remaining server to the determined pre-outage voltage associated with each remaining server.

10. The system of claim 7, where, in being configured to determine the future work load increase for each remaining server within the cluster of servers due to the scheduled outage for the server, the voltage regulation module is configured to:
determine a pre-outage work load for each remaining server within the cluster of servers;
determine a pre-outage work load for the server associated with the scheduled outage;
calculate increased work load capabilities for each remaining server relative to the determined pre-outage work load for each remaining server within the cluster of servers; and
identify the future work load increase for each remaining server based upon the calculated increased work load capabilities for each remaining server.

11. The system of claim 7, where, in being configured to calculate the voltage adjustment for each remaining server based upon the determined future work load increase for each remaining server, the voltage regulation module is configured to:
determine a required voltage increase for each remaining server based upon the determined future work load increase for each remaining server;
determine whether the required voltage increase for each remaining server exceeds a maximum voltage for each respective remaining server; and
set, for each respective remaining server determined to require the voltage increase that exceeds the maximum voltage for the respective server, the automated voltage adjustment to the maximum voltage for each respective remaining server.

12. A computer program product, comprising:
a computer readable storage device having computer readable program code embodied therewith, the computer readable program code comprising:
computer readable program code configured to receive, at a voltage regulation system (VRS) for a cluster of servers, information regarding a scheduled outage for a server associated with the cluster of servers;
computer readable program code configured to determine service level objectives (SLOs) for the cluster of servers;
computer readable program code configured to determine a future work load increase for each remaining server within the cluster of servers due to the scheduled outage for the server, comprising:
computer readable program code configured to determine the future work load increase for each remaining server based upon the determined SLOs for the cluster of servers; and computer readable program code configured to determine whether the SLOs for the cluster of servers are achieved by the cluster of servers during the scheduled outage;

computer readable program code configured to calculate a voltage adjustment for each remaining server based upon the determined future work load increase for each remaining server; and computer readable program code configured to automatically adjust voltage of each remaining server at the scheduled outage for the server using the respective calculated voltage adjustment for each remaining server.

13. The computer program product of claim 12, where the information regarding the scheduled outage for the server associated with the cluster of servers is received from a configuration management database and comprises a scheduled time and a scheduled duration associated with the scheduled outage for the server; and where the computer readable program code configured to automatically adjust the voltage of each remaining server at the scheduled outage for the server using the respective calculated voltage for each remaining server comprises computer readable program code configured to synchronize the automated voltage adjustment of each remaining server with the scheduled time associated with the scheduled outage for the server.

14. The computer program product of claim 13, further comprising:

computer readable program code configured to determine a pre-outage voltage associated with each remaining server;

computer readable program code configured to determine that the scheduled outage for the server has expired based upon the scheduled time and the scheduled duration associated with the scheduled outage for the server; and computer readable program code configured to automatically adjust the voltage for each remaining server to the determined pre-outage voltage associated with each remaining server.

15. The computer program product of claim 12, where the computer readable program code configured to determine the future work load increase for each remaining server within the cluster of servers due to the scheduled outage for the server comprises:

computer readable program code configured to determine a pre-outage work load for each remaining server within the cluster of servers;

computer readable program code configured to determine a pre-outage work load for the server associated with the scheduled outage;

computer readable program code configured to calculate increased work load capabilities for each remaining server relative to the determined pre-outage work load for each remaining server within the cluster of servers; and computer readable program code configured to identify the future work load increase for each remaining server based upon the calculated increased work load capabilities for each remaining server.

16. The computer program product of claim 12, where the computer readable program code configured to calculate the voltage adjustment for each remaining server based upon the determined future work load increase for each remaining server comprises:

computer readable program code configured to determine voltage versus performance characteristics for each remaining server; and computer readable program code configured to determine a voltage adjustment for each remaining server based upon the determined voltage versus performance characteristics for each remaining server.

17. The computer program product of claim 12, where the computer readable program code configured to calculate the voltage adjustment for each remaining server based upon the determined future work load increase for each remaining server comprises:

computer readable program code configured to determine a required voltage increase for each remaining server based upon the determined future work load increase for each remaining server;

computer readable program code configured to determine whether the required voltage increase for each remaining server exceeds a maximum voltage for each respective remaining server; and computer readable program code configured to set, for each respective remaining server determined to require the voltage increase that exceeds the maximum voltage for the respective server, the automated voltage adjustment to the maximum voltage for each respective remaining server.

* * * * *